J. Fasig,
Hay Knife.
Nº 34,356.  Patented Feb. 11, 1862.

Fig. 4.
Fig. 3.
Fig. 2.
Fig. 1.

Attest:
J. Brainerd
C. A. Mason

Inventor
John Fasig

UNITED STATES PATENT OFFICE.

J. FASIG, OF WEST SALEM, OHIO.

IMPROVEMENT IN HAY-KNIVES.

Specification forming part of Letters Patent No. 34,356, dated February 11, 1862.

*To all whom it may concern:*

Be it known that I, JOHN FASIG, of West Salem, in the county of Wayne and State of Ohio, have invented new and useful Improvements in Hay-Knives; and I do hereby declare that the following is a full and complete description of the construction and operation of the same, reference being had to the accompanying drawings, making part of this specification, in which—

Figure 1 is a perspective view. Fig. 2 is a front view. Fig. 3 is an edgewise view, and Fig. 4 is a vertical section.

Like letters refer to like parts in the several views.

The nature of my improvement relates, first, to the introduction of a friction-roller placed just above the back of the blade to prevent the stubs of hay from the standing mow to interrupt the withdrawing of the knife-blade; second, to a peculiar form of blade the edge of which has an oblique stroke upon the hay, and, third, to the form and structure of the handle.

In the several figures, A represents the blade. This stands obliquely in regard to a vertical line drawn between the two parts of the handle. The longer part is rounded off, as at $a$ in Figs. 1 and 2, and has a cutting-edge which extends to the spur $e$, Figs. 1 and 2, at the opposite end of the blade. The object of this spur is to prevent the knife from working off from the hay in the direction of $a$. At $i$ the back of the blade is beveled from the front side backward, by which means the stubs of the cut hay cannot obstruct the withdrawing of the blade.

The handle B B is in two branches, one of which rises from one end of the blade and the other from the other end, as seen in Figs. 1 and 2. The handle, in fact, is constructed mostly from one rod, the ends of which are welded to the ends of the blade, as above shown, and at about sixteen inches above the blade the two branches unite, and having at this point an auxiliary handle C welded to them, as shown in the several figures. The side rods B separate above this auxiliary handle and form the bow D, which is held by the right hand of the operator, while with the left hand he takes hold of the horizontal bow at C.

A friction-roller E, having bearings in the ascending rods B B, extends across from branch to branch of the handle, and which by its position prevents the stubs of hay from the standing mow from obstructing the withdrawal of the knife-blade.

What I claim as my improvement, and desire to secure by Letters Patent, is—

1. The friction-roller E, in combination with the blade A, constructed and operating as and for the purpose set forth.

2. The auxiliary handle C, in combination with the rods B, blade A, and roller E, constructed, arranged, and operating as described.

JOHN FASIG.

Witnesses:
   J. BRAINERD,
   S. H. MARTIN.